United States Patent
Ma et al.

(10) Patent No.: US 11,747,245 B2
(45) Date of Patent: Sep. 5, 2023

(54) LOAD CONTROL METHOD OF INDENTER BASED ON FUZZY PREDICTIVE CONTROL AND SYSTEM THEREOF

(71) Applicant: Xiangtan University, Xiangtan (CN)

(72) Inventors: Zengsheng Ma, Xiangtan (CN); Dian Peng, Xiangtan (CN); Yichun Zhou, Xiangtan (CN)

(73) Assignee: XIANGTAN UNIVERSITY, Hunan Province (CN)

( * ) Notice: Subject to any disclaimer, the term of this patent is extended or adjusted under 35 U.S.C. 154(b) by 191 days.

(21) Appl. No.: 17/354,966

(22) Filed: Jun. 22, 2021

(65) Prior Publication Data

US 2022/0205886 A1    Jun. 30, 2022

(30) Foreign Application Priority Data

Dec. 30, 2020 (CN) .......................... 202011624380.8

(51) Int. Cl.
| | |
|---|---|
| *G01N 3/06* | (2006.01) |
| *G01N 3/08* | (2006.01) |
| *G05B 13/02* | (2006.01) |
| *G01N 3/42* | (2006.01) |
| *G06N 5/048* | (2023.01) |

(52) U.S. Cl.
CPC .................. *G01N 3/06* (2013.01); *G01N 3/08* (2013.01); *G05B 13/0295* (2013.01); *G06N 5/048* (2013.01); *G01N 2203/0019* (2013.01); *G01N 2203/0032* (2013.01)

(58) Field of Classification Search
CPC .. G01N 3/44; G01N 3/42; G01N 3/06; G01N 3/08; G01N 3/32; G01N 3/066; G01N 3/40; G05B 13/048; G05B 17/02; G05B 11/42; G05B 13/042; G05B 13/04; G05B 19/401; G01M 17/007; G11B 5/54; G06F 30/13
See application file for complete search history.

(56) References Cited

U.S. PATENT DOCUMENTS

| | | | |
|---|---|---|---|
| 10,139,327 B2* | 11/2018 | Puchnin ................. | G01B 7/003 |
| 10,928,281 B2* | 2/2021 | Iwakiri .................... | G01N 3/08 |
| 2003/0080721 A1* | 5/2003 | Lee .......................... | G01N 3/42 |
| | | | 324/71.1 |

* cited by examiner

*Primary Examiner* — Brandi N Hopkins
(74) *Attorney, Agent, or Firm* — Thomas | Horstemeyer, LLP

(57) ABSTRACT

A load control method and a load control system of an indenter based on fuzzy predictive control, are provided. The method includes acquiring an actual measured force value of a sensor and an expected force value of the $n^{th}$ cycle in the loading stage; calculating a first error and a change rate; establishing and optimizing a fuzzy predictive controller; determining movement steps of a motor in the loading stage; acquiring the actual measured value of the sensor and an expected force value of the $n^{th}$ cycle in the full load stage; controlling the movement of the motor; acquiring the actual measured force value of the sensor and an expected force value of the $n^{th}$ cycle in the unloading stage; calculating a third error and a change rate; and determining the movement steps of the motor in the unloading stage.

8 Claims, 7 Drawing Sheets

LOAD CONTROL METHOD OF INDENTER BASED ON FUZZY PREDICTIVE CONTROL AND SYSTEM THEREOF

TECHNICAL FIELD

The present disclosure relates to the field of fuzzy control, in particular to a load control method of an indenter based on fuzzy predictive control and a system thereof.

BACKGROUND

Instrumental indentation testing technology acquires a load-displacement relationship curve by recording load and indentation depth, and then acquires elastic modulus, hardness, stress-strain curve, fracture toughness, fatigue characteristics, creep characteristics, adhesion and other parameters by analyzing the curve. Micro-nano indentation technology is becoming the first choice for testing the mechanical properties of micro/nano-scale materials and structures because of its advantages of simple operation, high measurement efficiency and wide application range. Therefore, companies at home and abroad have studied the device for micro-nano indentation test. Because the parameters acquired by the indenter need to be acquired by analyzing the load-displacement relationship curve, and the quality of the load-displacement relationship curve is influenced by the load control method, it is an important demand for micro-nano indentation test to design a load control method of an indenter, which is stable and accurate, superior in control performance and simple to implement.

In the indentation experiment of an indenter, the images of load-displacement relationship curves are different according to different test materials and set parameters, and there is a gap between the values of displacement sensors and real displacements. It is also influenced by the factors such as the deformation of force sensors and mechanical structures and environmental temperature, which makes it difficult to establish an accurate physical model. Therefore, the fuzzy predictive control algorithm is introduced to control the indentation process of an indenter.

SUMMARY

The purpose of the present disclosure is to provide a load control method of an indenter based on fuzzy predictive control and a system thereof, which are stable and accurate, superior in control performance and simple to implement.

To achieve the above purpose, the present disclosure provides the following scheme:

a load control method of an indenter based on fuzzy predictive control, wherein the control method comprises:

acquiring the actual measured force value of a sensor in the loading stage, which is denoted as a first actual measured force value;

acquiring an expected force value of the nth cycle in the loading stage, which is denoted as a first expected force value;

calculating a first error according to the first actual measured force value and the first expected force value; determining a first error change rate based on the difference between the current cycle error and the previous cycle error;

establishing a fuzzy predictive controller;

optimizing the fuzzy predictive controller;

inputting the first error and the first error change rate into an optimized fuzzy predictive controller to acquire the movement steps of a motor in the loading stage;

sending the movement steps of the motor in the loading stage to an actuator, controlling the movement of the motor until the set load is reached, and entering the full load stage;

acquiring the actual measured value of the sensor in the full load stage, which is denoted as a second actual measured force value;

acquiring the expected force value of the nth cycle in the full load stage, which is denoted as a second expected force value;

calculating a second error based on the second actual measured force value and the second expected force value;

controlling the movement of the motor based on the second error until the full load time is reached, and entering the unloading stage;

acquiring the actual measured force value of the sensor in the unloading stage, which is denoted as a third actual measured force value;

acquiring the expected force value of the nth cycle in the unloading stage, which is denoted as a third expected force value;

calculating a third error according to the third actual measured force value and the third expected force value; determining a third error change rate based on the difference between the current cycle error and the previous cycle error;

inputting the third error and the third error change rate into the optimized fuzzy predictive controller to acquire the movement steps of the motor in the unloading stage;

sending the movement steps of the motor in the unloading stage to the actuator, and controlling the movement of the motor until the load is reduced to zero.

According to the specific embodiment provided by the present disclosure, the present disclosure discloses the following technical effects.

According to the method disclosed by the present disclosure, fuzzy predictive control is adopted in the indenting process of the indenter, so that the algorithm is simple and easy to implement, the system has strong robustness and stability, the load adaptive adjustment can be realized, and the data of the indenting experiment can be improved, thereby acquiring more ideal experimental results; according to the fuzzy prediction algorithm in the present disclosure, the controller can adjust the motor movement amount in the next step according to the load data, so as to achieve the purpose of reducing the load control error. The method in the present disclosure is suitable for the complex dynamic adjustment process of indentation test of the indenter with load linearly changing with time, and includes error handling function. When an error that cannot be handled occurs, the experiment is ended to prevent the error from damaging the indentation test, enhance the use experience of the indenter and prolong the service life of the indenter. The method in the present disclosure can also be slightly modified and applied to other similar application scenarios.

BRIEF DESCRIPTION OF THE DRAWINGS

In order to explain the embodiments of the present disclosure or the technical scheme in the prior art more clearly, the drawings needed in the embodiments will be briefly introduced hereinafter. Obviously, the drawings in the following description are only some embodiments of the present disclosure, and for those skilled in the art, other drawings can be obtained according to these drawings without paying creative labor.

DETAILED DESCRIPTION

The technical scheme in the embodiments of the present disclosure will be described clearly and completely with reference to the drawings in the embodiments of the present disclosure. Obviously, the described embodiments are only some embodiments of the present disclosure, rather than all of the embodiments. Based on the embodiments of the present disclosure, all other embodiments obtained by those skilled in the art without paying creative labor belong to the scope of protection of the present disclosure.

The purpose of the present disclosure is to provide a load control method of an indenter and system based on fuzzy predictive control, which are stable and accurate, superior in control performance and simple to implement.

In order to make the above objects, features and advantages of the present disclosure more obvious and understandable, the present disclosure will be further explained in detail with reference to the drawings and specific embodiments.

Figure 1:
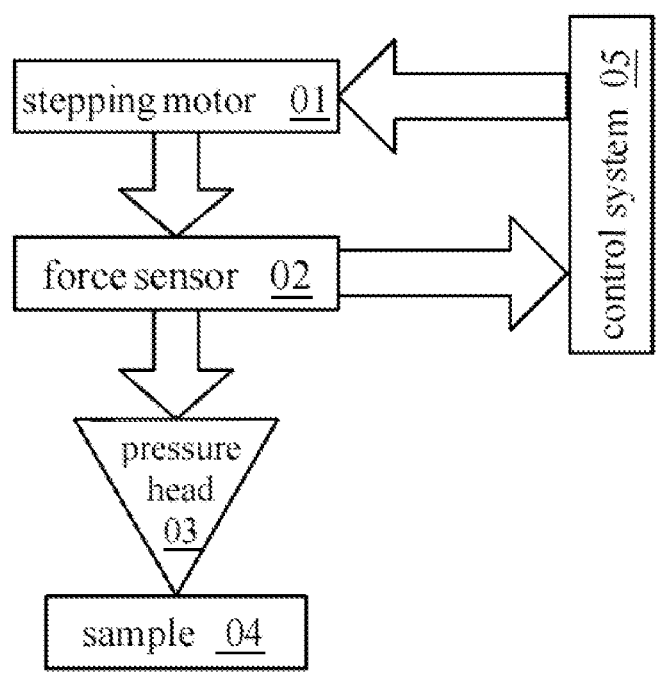
FIG. 1 is a structural block diagram of an application scenario according to an embodiment of the present disclosure.

FIG. 1 is a structural block diagram of an application scenario according to an embodiment of the present disclosure. As shown in FIG. 1, the application scenario comprises a stepping motor 01, a force sensor 02, a pressure head 03, a sample 04 and a control system 05. The control system 05 controls the stepping motor 01 to rotate in combination with the force value collected by the force sensor 02, thereby driving the pressure head 03 to rise or fall.

Figure 2:
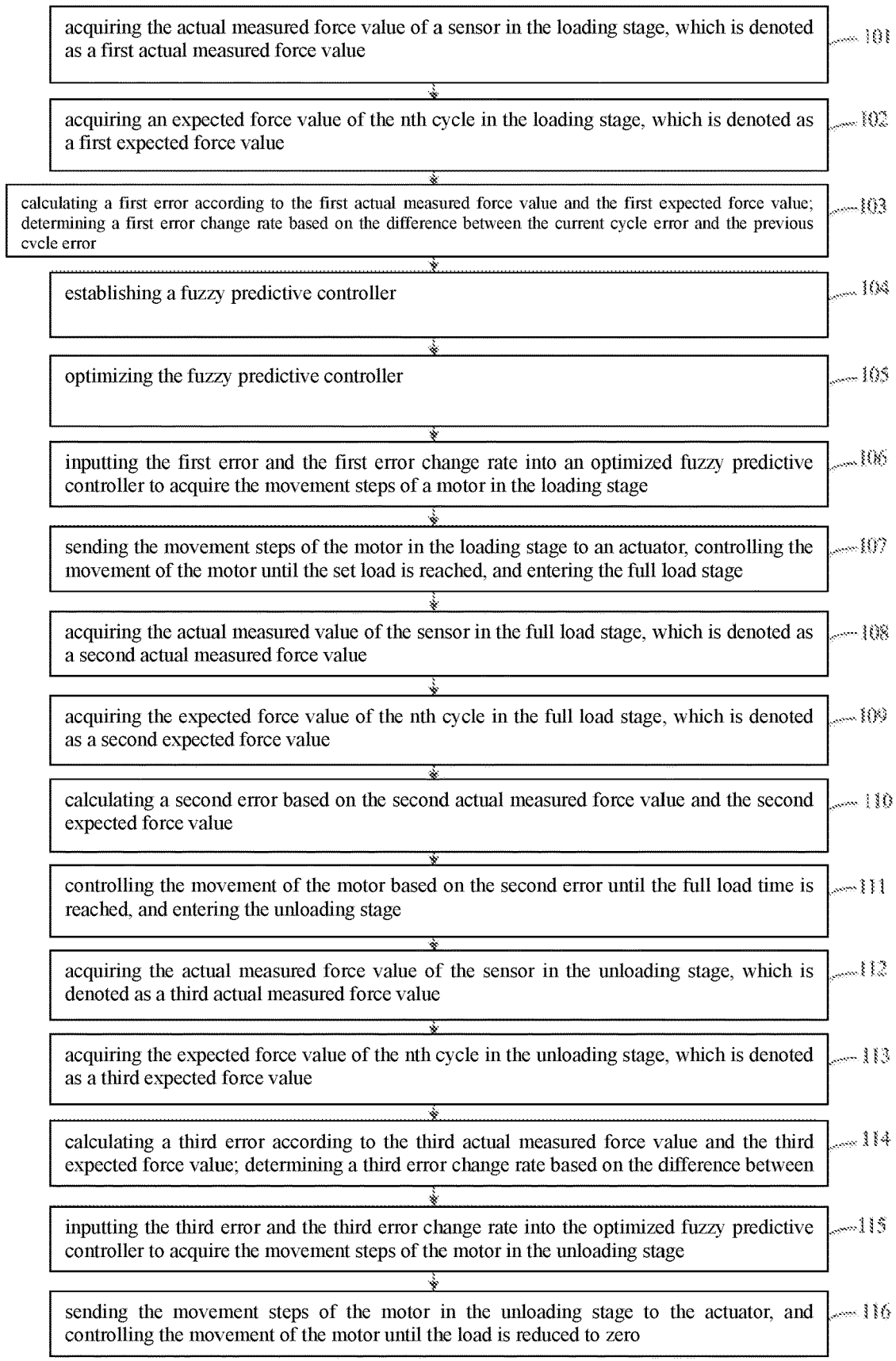
FIG. 2 is a flow chart of a load control method of an indenter based on fuzzy predictive control according to an embodiment of the present disclosure.

FIG. 2 is a flow chart of a load control method of an indenter based on fuzzy predictive control according to an embodiment of the present disclosure. An experimenter inputs loading force F, loading time T1, full load time T2 and unloading time T3. The experiment is divided into three stages: loading stage, full load stage and unloading stage.

The experimenter inputs relevant parameters to the controller. In the loading stage, the controller outputs a pulse by setting parameters until the motor driver drives the motor to drive the pressure head 03 to press the sample 04. In the moving process, the real-time force value is returned by collecting data from the force sensor 02, and the method of the present disclosure is used to adjust the motor movement mode so that the load increases linearly with time until reaching the set load point and entering the full load stage.

In the full load stage, when the load value is less than the set load, the controller controls to output a pulse by setting parameters until the motor driver drives the motor to rise or fall until the load value reaches the set load, and then enters the unloading stage after the full load time is over.

In the unloading stage, the controller outputs a pulse by setting parameters until the motor driver drives the motor to drive the pressure head 03 to rise. In the moving process, the real-time force value is returned by collecting data from the force sensor 02, and the method of the present disclosure is used to adjust the motor movement mode so that the load decreases linearly with time until reaching the point where the load is zero. The experiment ends at this time.

As shown in FIG. 2, the method comprises:

loading stage:

Step 101: acquiring the actual measured force value of a sensor in the loading stage, which is denoted as a first actual measured force value;

Step 102: acquiring an expected force value of the nth cycle in the loading stage, which is denoted as a first expected force value;

Step 103: calculating a first error according to the first actual measured force value and the first expected force value; determining a first error change rate based on the difference between the current cycle error and the previous cycle error;

Step 104: establishing a fuzzy predictive controller;

Step 105: optimizing the fuzzy predictive controller;

Step 106: inputting the first error and the first error change rate into an optimized fuzzy predictive controller to acquire the movement steps of a motor in the loading stage;

Step 107: sending the movement steps of the motor in the loading stage to an actuator, controlling the movement of the motor until the set load is reached, and entering the full load stage;

full load stage:

Step 108: acquiring the actual measured value of the sensor in the full load stage, which is denoted as a second actual measured force value;

Step 109: acquiring the expected force value of the nth cycle in the full load stage, which is denoted as a second expected force value;

Step 110: calculating a second error based on the second actual measured force value and the second expected force value;

Step 111: controlling the movement of the motor based on the second error until the full load time is reached, and entering the unloading stage; unloading stage:

Step 112: acquiring the actual measured force value of the sensor in the unloading stage, which is denoted as a third actual measured force value;

Step 113: acquiring the expected force value of the nth cycle in the unloading stage, which is denoted as a third expected force value;

Step 114: calculating a third error according to the third actual measured force value and the third expected force value; determining a third error change rate based on the difference between the current cycle error and the previous cycle error;

Step 115: inputting the third error and the third error change rate into the optimized fuzzy predictive controller to acquire the movement steps of the motor in the unloading stage;

Step 116: sending the movement steps of the motor in the unloading stage to the actuator, and controlling the movement of the motor until the load is reduced to zero.

Specifically, in the loading stage, the whole process is divided into N cycles according to the sensor acquiring frequency F and the loading time T1, in which $$N = T1f$$

In N cycles, the control goal is that the increment of the load in each cycle is equal, so that the relationship between load and time is linear. In N regulation cycles, at the beginning of each cycle, the input is processed and output by the fuzzy predictive controller, and the cycle is repeated until entering the full load stage.

It is assumed that ΔF is the force value to be loaded in each movement cycle in the loading stage, in which $$\Delta F = F/N$$

where F is the force value to be loaded for experiment setting.

It is assumed that the expected force in the nth cycle of the loading stage is $F_n$, the force value of the current actual sensor is $F_{En}$, and the difference between the actual force value and the expected force value in the nth cycle be $\Delta F_n$, in which $$F_{En} = n\Delta F$$
$$\Delta F_n = F_{En} - F_n$$

Figure 3:
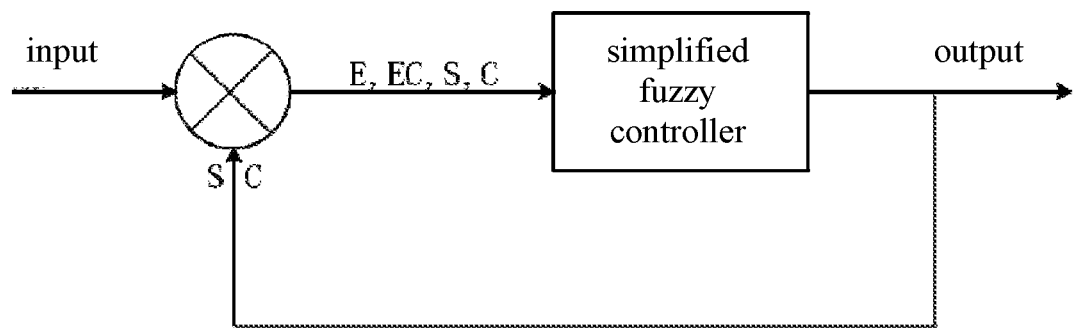
FIG. 3 is a schematic diagram of fuzzy control according to an embodiment of the present disclosure.

The fuzzy controller is therefore established. FIG. 3 is a schematic diagram of fuzzy control. The input amount of the system is determined as error E, i.e. $\Delta F_n$, the error change rate is EC, and the output amount is the movement steps U of the motor, in which $$EC = \Delta F_n - \Delta F_{n-1}$$

Figure 6:
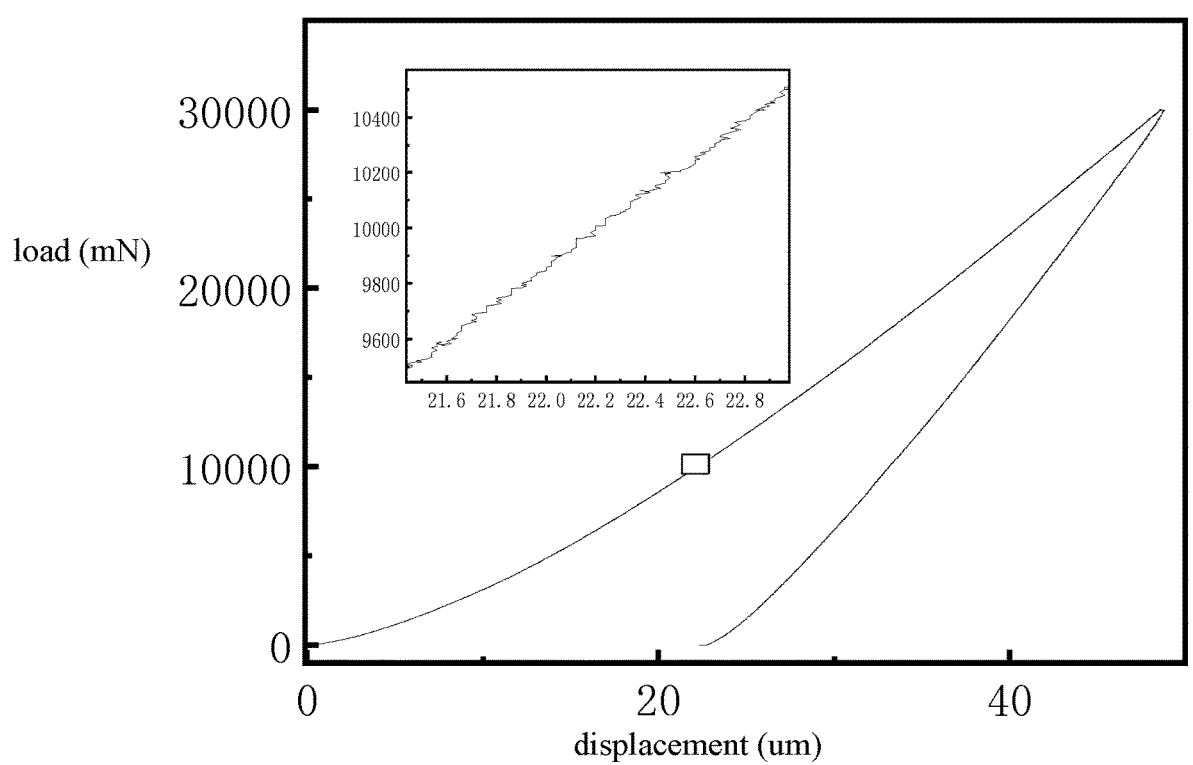
FIG. 6 is an experimental result of fuzzy predictive control and a partial enlarged view according to an embodiment of the present disclosure.

As shown in FIG. 6, the slope of the ideal load-displacement relationship curve at the beginning of the loading stage is very small, that is, more movement steps of the motor are required to meet the movement requirement, which is calculated using the experimental empirical formula here:

$$S = 10\Delta F$$

where S is the basic movement steps of the motor in each cycle, the unit is nm, and ΔF is in the unit of mN.

The difference E between the current force value and the expected force value in the loading stage is divided into five grades: NB, NS, ZO, PS and PB. The error change rate EC is divided into three grades: N, Z and P.

For the error E, PB has a grade range that the difference is greater than 5ΔF, PS has a grade range that the difference is within Δf~5Δf, ZO has a grade range that the difference is within −Δf~Δf, NS has a grade range that the difference is within −5Δf~−Δf, and NB has a grade range that the difference is less than −5Δf. For the error change rate EC, P has a grade range that the difference is greater than 10ΔF, Z of zero has a grade range that the difference is within the range of −10ΔF~10ΔF, and N has a grade range that the difference is greater than −10ΔF.

The fuzzy set of the output U of the loading stage is divided into seven grades: NB, NM, NS, ZO, PS, PM and PB. Because when the displacement of each step is small enough, the change of load is small. At the same time, in order to simplify the application and reduce the CPU occupation, the fuzzy control model is simplified, and a simple one-to-one method is adopted to establish a fuzzy control rule table. The control amount of output U is determined by the range of E and EC, as shown in Table 1.

That is, when E belongs to NB and EC belongs to N, the output belongs to NB; when E belongs to NS and EC belongs to N or when E belongs to NB and EC belongs to Z, the output belongs to NM; when E belongs to ZO and EC belongs to N or when E belongs to NS and EC belongs to Z or when E belongs to NB and EC belongs to P, the output belongs to NS; when E belongs to PS and EC belongs to N or when E belongs to Z or E belongs to NS and EC belongs to P, the output belongs to ZO; when E belongs to PB and EC belongs to N or when E belongs to PS and EC belongs to Z or when E belongs to ZO and EC belongs to P, the output belongs to PS; when E belongs to PB and EC belongs to Z or when E belongs to PS and EC belongs to P, the output belongs to PM; and when E belongs to PB and EC belongs to P, the output belongs to PB.

TABLE 1

| U | | E | | | | |
|---|---|---|---|---|---|---|
|   |   | NB | NS | ZO | PS | PB |
| EC | N | NB | NM | NS | ZO | PS |
|   | Z | NM | NS | ZO | PS | PM |
|   | P | NS | ZO | PS | PM | PB |

Further preferably, the adaptive factor C and the basic movement number S of each cycle are introduced to optimize the controller, and the output is shown in Table 2. It is assumed that the initial value of the movement change C is 1;

TABLE 2

| Fuzzy set | Operation | Output |
|---|---|---|
| NB | S = S − C; C=1 | 0 |
| NM | C−−; S−− | 0 |
| NS | S−− | S |
| ZO |  | S |
| PS | S++ | S |
| PM | C++; S++ | S |
| PB | C++; S = S + 2C | S | where S is always greater than or equal to 0 and C is always greater than or equal to 1.

After the fuzzy set to which error E and error change rate EC belong to is subjected to one-to-one correspondence according to Table 1, the obtained fuzzy set of U will be processed. That is, if the output U belongs to NB, the reduction of S is C, C is set to 1, and the output is 0, that is, the motor does not move; if the output U belongs to NM, the reduction of S is 1, the reduction of C is 1, and the output is 0, that is, the motor does not move; if the output U belongs to NS, the reduction of S is 1, C is unchanged, and the output is S, that is, the motor moves S steps; if the output U belongs to ZO, S and C are unchanged, and the output is S, that is, the motor moves S steps; if the output U belongs to PS, the increase of S is 1, C is unchanged, and the output is S, that is, the motor moves S steps; if the output U belongs to PM, the increase of S is 1, the increase of C is 1, and the output is S, that is, the motor moves S steps; if the output U belongs to PB, the increase of S is 2C, the increase of C is 1, and the output is S, that is, the motor moves S steps.

When the loading force value reaches the set force value, it enters the full load stage, and the full load timer starts to time. In the full load stage, it is necessary to keep the force value unchanged, but due to creep, the force value measured by the force sensor 02 gradually decreases due to the increasing strain. At this time, the motor drives the pressure head 03 to press down to increase the force value to the set value.

At the beginning of the full load stage, the force value may be larger than the set value F due to the excessive movement steps of the motor in the loading stage. At this time, it is necessary to reduce the load value and judge the relationship between the current force value $F_{En}$ and the input load value F. When the current force value is larger than $F+\Delta F$, the motor drives the pressure head 03 to rise one step. In the full load stage, the movement of the motor is controlled to increase the load according to the difference between the current force value and the expected force value through simple feedback adjustment. That is, when the current force value in the full load stage is less than $F-\Delta F$, the motor drives the pressure head 03 to press down one step.

Figure 7:
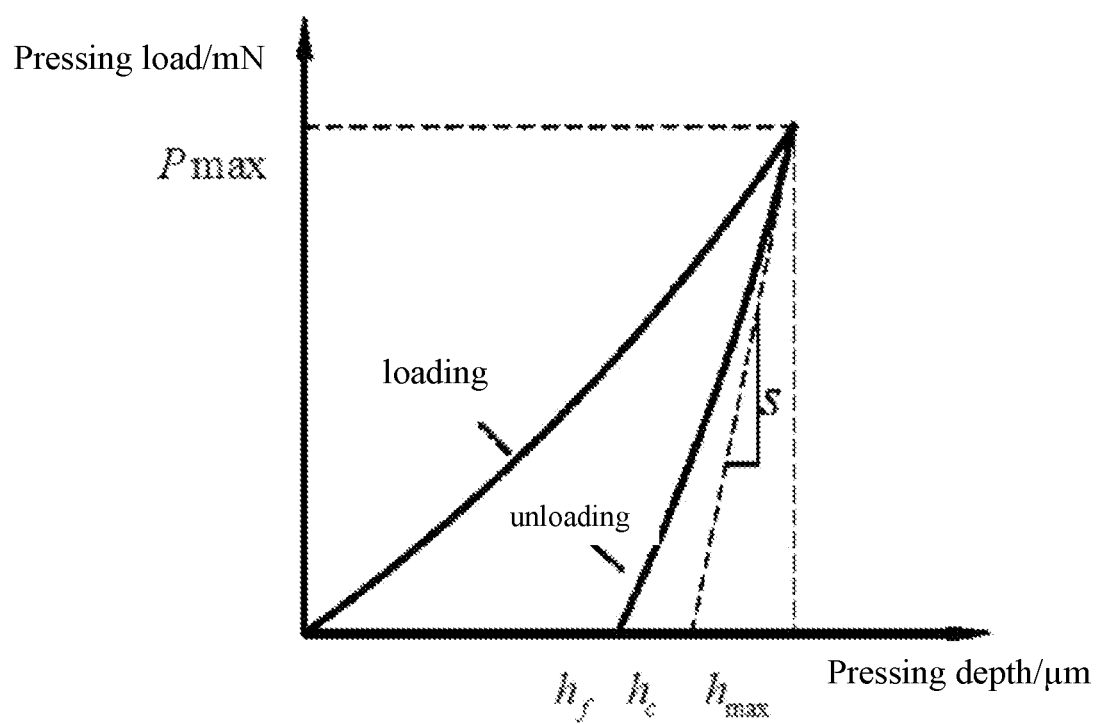
FIG. 7 is an ideal load-displacement graph according to an embodiment of the present disclosure.

When the value of the full load timer reaches the full load time T2, the full load stage ends and enters the unloading stage. As shown in FIG. 7, due to the residual depth, and the slope of the ideal load-displacement relationship curve at the beginning of unloading stage is larger than the slope in the full load stage, that is, the motor needs to move a small number of steps to meet the movement requirement. When S>1, S=S/2. In the unloading stage, the whole process is divided into Nu cycles according to the sensor acquiring frequency F and the loading time T3, in which $$N_u = T3f$$

In $N_u$ cycles, the control goal is that the increment of the load in each cycle is equal, so that the relationship between load and time is linear. In $N_u$ regulation cycles, at the beginning of each cycle, the input is processed and output by the fuzzy predictive controller, and the cycle is repeated until entering the unloading stage.

It is assumed that $\Delta F_u$ is the force value to be loaded in each movement cycle in the unloading stage, in which $$\Delta F_u = F_u/N$$

where $F_u$ is the force value at the end of unloading stage.

It is assumed that the expected force in the nth cycle of the loading stage is $F_{un}$, the force value of the current actual sensor is $F_{Eun}$, and the difference between the actual force value and the expected force value in the nth cycle be $\Delta F_n$, in which $$F_{Eun} = n\Delta F_u$$
$$\Delta F_n = F_{un} - F_{Eun}$$

The fuzzy controller is therefore established. The input amount of the system is determined as error E, i.e. $\Delta F_n$, the error change rate is EC, and the output amount is the movement steps U of the motor, in which $$EC = \Delta F_{un-1} - \Delta F_{un}$$

The difference E between the current force value and the expected force value in the unloading stage is divided into five grades: NB, NS, ZO, PS and PB. The error change rate EC is divided into three grades: N, Z and P.

For the error E, PB has a grade range that the difference is greater than $5\Delta F$, PS has a grade range that the difference is within $\Delta f\sim5\Delta f$, ZO has a grade range that the difference is within $-\Delta f\sim\Delta f$, NS has a grade range that the difference is within $-5\Delta f\sim-\Delta f$, and NB has a grade range that the difference is less than $-5\Delta f$. For the error change rate EC, P has a grade range that the difference is greater than $10\Delta F$, Z of zero has a grade range that the difference is within the range of $-10\Delta F\sim10\Delta F$, and N has a grade range that the difference is greater than $-10\Delta F$.

The fuzzy set of the output U of the unloading stage is divided into seven grades: NB, NM, NS, ZO, PS, PM and PB. Because when the displacement of each step is small enough, the change of load is small. At the same time, in order to simplify the application and reduce the CPU occupation, the fuzzy control model is simplified, and a simple one-to-one method is adopted to establish a fuzzy control rule table. The control amount of output U is determined by the range of E and EC, as shown in Table 1.

That is, when E belongs to NB and EC belongs to N, the output belongs to NB; when E belongs to NS and EC belongs to N or when E belongs to NB and EC belongs to Z, the output belongs to NM; when E belongs to ZO and EC belongs to N or when E belongs to NS and EC belongs to Z or when E belongs to NB and EC belongs to P, the output belongs to NS; when E belongs to PS and EC belongs to N or when E belongs to Z or E belongs to NS and EC belongs to P, the output belongs to ZO; when E belongs to PB and EC belongs to N or when E belongs to PS and EC belongs to Z or when E belongs to ZO and EC belongs to P, the output belongs to PS; when E belongs to PB and EC belongs to Z or when E belongs to PS and EC belongs to P, the output belongs to PM; and when E belongs to PB and EC belongs to P, the output belongs to PB.

The adaptive factor C and the basic movement number S of each cycle are introduced to optimize the controller, and the output is shown in Table 2. It is assumed that the initial value of the movement change C is 1;

where S is always greater than or equal to 0 and C is always greater than or equal to 1.

After the fuzzy set to which error E and error change rate EC belong to is subjected to one-to-one correspondence according to Table 1, the obtained fuzzy set of U will be processed. That is, if the output U belongs to NB, the reduction of S is C, C is set to 1, and the output is 0, that is, the motor does not move; if the output U belongs to NM, the reduction of S is 1, the reduction of C is 1, and the output is 0, that is, the motor does not move; if the output U belongs to NS, the reduction of S is 1, C is unchanged, and the output is S, that is, the motor moves S steps; if the output U belongs to ZO, S and C are unchanged, and the output is S, that is, the motor moves S steps; if the output U belongs to PS, the increase of S is 1, C is unchanged, and the output is S, that is, the motor moves S steps; if the output U belongs to PM, the increase of S is 1, the increase of C is 1, and the output is S, that is, the motor moves S steps; if the output U belongs to PB, the increase of S is 2C, the increase of C is 1, and the output is S, that is, the motor moves S steps.

When the final load value reduces to 0, the whole unloading stage ends and the experimental flow ends.

In order to compare the performance of the method described by the present disclosure, the fuzzy predictive control strategy designed by the present disclosure is compared with the traditional PID controller. The motor used in the experiment is PX534 of Oriental Motor, and the step distance is 4 nm after subdividing into 250 steps; the force sensor 02 is NS-WL5 made by Tianmu, the dynamic error is 2.5 mN, and the experimental material is 7075 aluminum. It should be noted that the experimental variables among the three are the same except the controller. The set force is 20N, the loading time is 20S, and the unloading time is 10S. When the load value is less than zero, the experiment ends.

Although strict isotropy cannot be guaranteed in the material in the experiment, the physical properties will not change too much in short displacement. When the loading force is greater than the upper limit set by the force sensor 02, the experiment immediately enters the unloading stage and then stops to protect the indenter.

Figure 4:
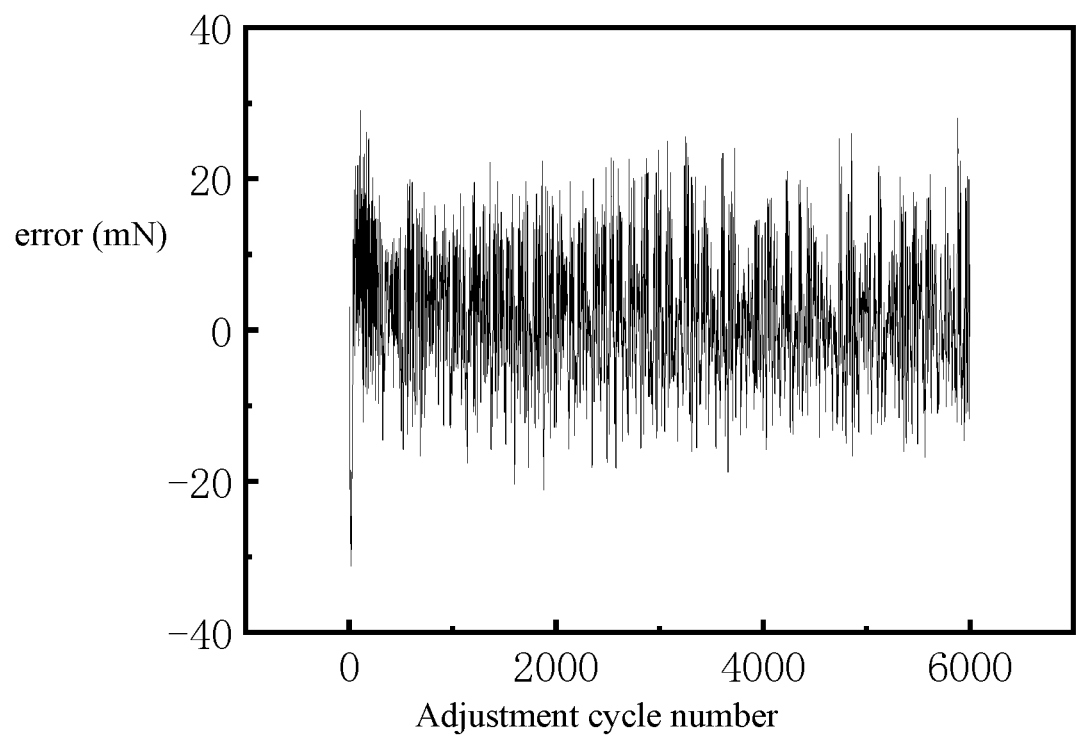
FIG. 4 is a distribution diagram of error results of fuzzy predictive control according to an embodiment of the present disclosure.
Figure 5:
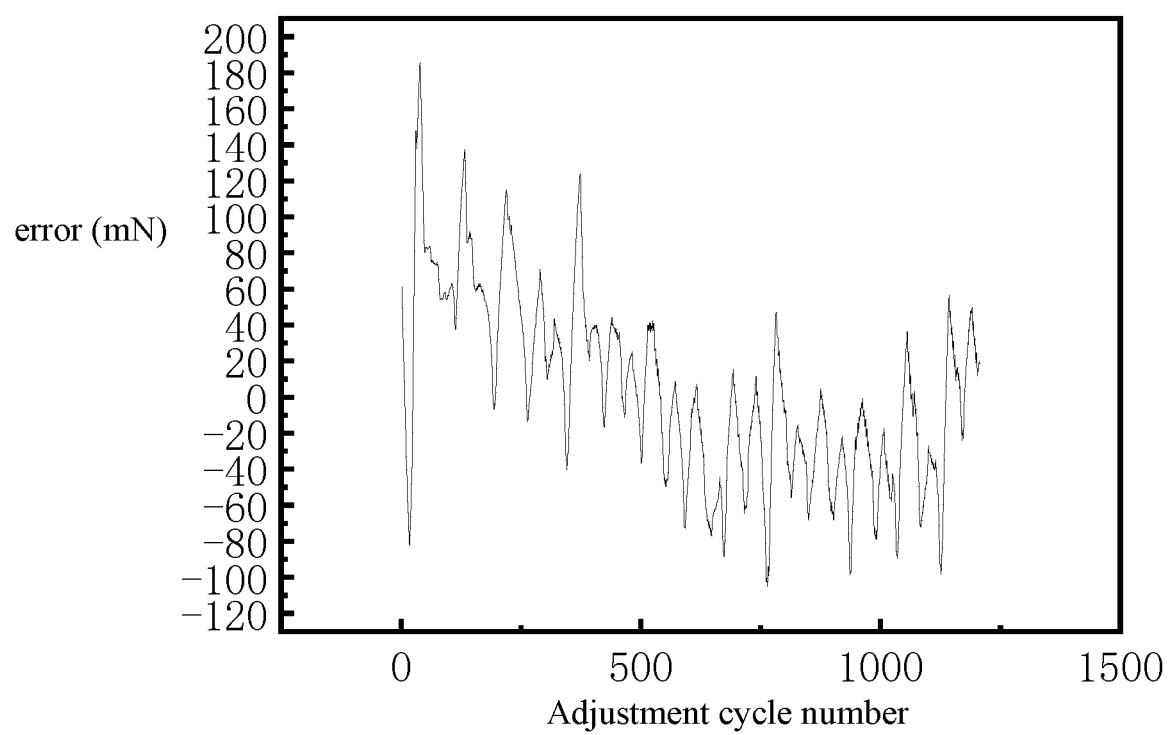
FIG. 5 is a distribution diagram of PID control error results according to an embodiment of the present disclosure.

FIG. 4 and FIG. 5 are error comparison diagrams of two sets of data in the loading stage and the unloading stage of indentation experiment in sequence. Here, average error and maximum error are used as indicators to measure the quality of the controller. The comparison of experimental results is shown in Table 3.

TABLE 3

|  | Average error (mN) | maximum error (Mn) |
|---|---|---|
| Fuzzy control algorithm | 6.99 | 35.31 |
| PID control algorithm | 42.00 | 185.27 |

The experimental results show that the fuzzy predictive controller has better control effect when the experiment is carried out under the same parameter setting.

As shown in FIG. 4 and FIG. 5, the two controllers have large fluctuations at the beginning, but the adjustment speed of the fuzzy controller is obviously much faster, and it is easy for the PID controller to cause system instability and overshoot due to the existence of an integral term. With the advance of the experiment, the fuzzy controller stabilizes the error in a relatively small range, while the PID controller fluctuates greatly because it cannot adapt to the change of experimental characteristics from the beginning to the end. The simplified fuzzy control is equivalent to following the trail, which can greatly adapt to the changes of different materials in different stages. Table 4 shows the error performance of the fuzzy predictive controller in experiments on different materials.

TABLE 4

|  | Average error (mN) | maximum error (Mn) |
|---|---|---|
| Pure aluminum | 8.31 | 30.09 |
| Pure tungsten | 7.48 | 31.30 |

It can be predicted that when sensors with higher accuracy and smaller errors and stepping motors with smaller step distance are used, better results can be acquired by appropriately changing the controller. By reducing the error between the experimental load and the expected load, the whole curve can be made smoother, and the relationship between load and displacement can be reflected more truly, which is beneficial to the in-depth analysis and research by using the load-displacement graph, and can effectively eliminate the lag error of the force sensor to get better experimental results.

Figure 8:
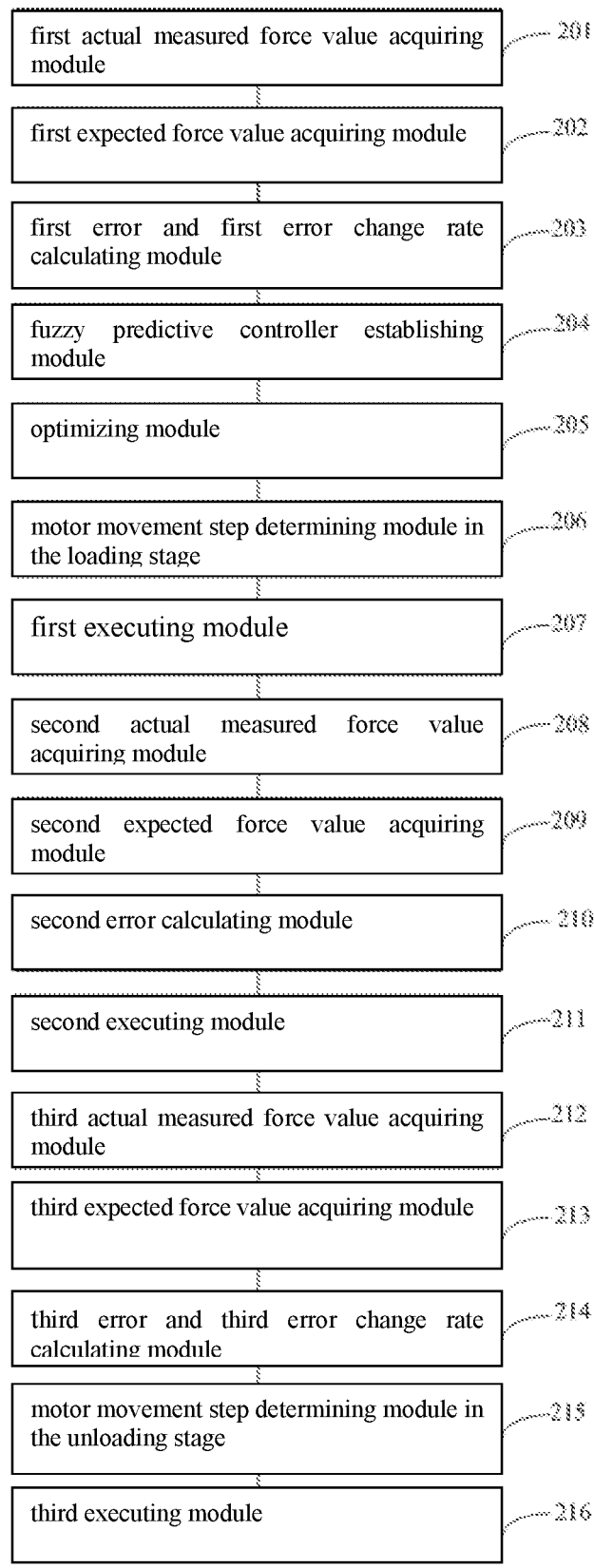
FIG. 8 is a schematic structural diagram of a load control system of an indenter based on fuzzy predictive control according to an embodiment of the present disclosure.

FIG. 8 is a structural schematic diagram of a load control system of an indenter based on fuzzy predictive control according to an embodiment of the present disclosure. As shown in FIG. 8, the system comprises:

a first actual measured force value acquiring module 201, which is configured to acquire the actual measured force value of a sensor in the loading stage, which is denoted as a first actual measured force value;

a first expected force value acquiring module 202, which is configured to acquire an expected force value of the nth cycle in the loading stage, which is denoted as a first expected force value;

a first error and first error change rate calculating module 203, which is configured to calculate a first error according to the first actual measured force value and the first expected force value; determine a first error change rate based on the difference between the current cycle error and the previous cycle error;

a fuzzy predictive controller establishing module 204, which is configured to establish a fuzzy predictive controller;

an optimizing module 205, which is configured to optimize the fuzzy predictive controller;

a motor movement step determining module in the loading stage 206, which is configured to input the first error and the first error change rate into an optimized fuzzy predictive controller to acquire the movement steps of a motor in the loading stage;

a first executing module 207, which is configured to send the movement steps of the motor in the loading stage to an actuator, control the movement of the motor until the set load is reached, and enter the full load stage;

a second actual measured force value acquiring module 208, which is configured to acquire the actual measured value of the sensor in the full load stage, which is denoted as a second actual measured force value;

a second expected force value acquiring module 209, which is configured to acquire the expected force value of the nth cycle in the full load stage, which is denoted as a second expected force value;

a second error calculating module 210, which is configured to calculate a second error based on the second actual measured force value and the second expected force value;

a second executing module 211, which is configured to control the movement of the motor based on the second error until the full load time is reached, and enter the unloading stage;

a third actual measured force value acquiring module 212, which is configured to acquire the actual measured force value of the sensor in the unloading stage, which is denoted as a third actual measured force value;

a third expected force value acquiring module 213, which is configured to acquire the expected force value of the nth cycle in the unloading stage, which is denoted as a third expected force value;

a third error and third error change rate calculating module 214, which is configured to calculate a third error according to the third actual measured force value and the third expected force value; determine a third error change rate based on the difference between the current cycle error and the previous cycle error;

a motor movement step determining module in the unloading stage 215, which is configured to input the third error and the third error change rate into the optimized fuzzy predictive controller to acquire the movement steps of the motor in the unloading stage;

a third executing module 216, which is configured to send the movement steps of the motor in the unloading stage to the actuator, and control the movement of the motor until the load is reduced to zero.

The control system further comprises a power turning-off module, which is configured to immediately turn off the power supply when the indenter fails.

In addition, by modifying the rules appropriately, the idea of this method can be applied to the scene where the input and output will not change too much in a short range, that is, the change rate is very small.

In this specification, each embodiment is described in a progressive manner, and each embodiment focuses on the differences from other embodiments. It is sufficient to refer to the same and similar parts among each embodiment. For the system disclosed in the embodiment, because the system corresponds to the method disclosed in the embodiment, the description is relatively simple, and the relevant points can be found in the description of the method.

In this specification, a specific example is applied to illustrate the principle and implementation of the present disclosure, and the explanation of the above embodiments is only used to help understand the method and its core idea of the present disclosure; at the same time, according to the idea of the present disclosure, there will be some changes in the specific implementation and application scope for those skilled in the art. To sum up, the contents of this specification should not be construed as limiting the present disclosure.

What is claimed is:

1. A load control method of an indenter based on fuzzy predictive control, wherein the load control method comprises:

acquiring an actual measured force value of a sensor in a loading stage, which is denoted as a first actual measured force value;

acquiring an expected force value of an $n^{th}$ cycle in the loading stage, which is denoted as a first expected force value;

calculating a first error according to the first actual measured force value and the first expected force value, and determining a first error change rate based on a difference between a current cycle error and a previous cycle error;

establishing a fuzzy predictive controller;

optimizing the fuzzy predictive controller;

inputting the first error and the first error change rate into the optimized fuzzy predictive controller to acquire movement steps of a motor in the loading stage;

sending the movement steps of the motor in the loading stage to an actuator, controlling the motor to move until a set load is reached, and entering a full load stage;

acquiring an actual measured value of the sensor in the full load stage, which is denoted as a second actual measured force value;

acquiring an expected force value of an $n^{th}$ cycle in the full load stage, which is denoted as a second expected force value;

calculating a second error based on the second actual measured force value and the second expected force value;

controlling the motor to move based on the second error until full load time is reached, and entering an unloading stage;

acquiring an actual measured force value of the sensor in the unloading stage, which is denoted as a third actual measured force value;

acquiring an expected force value of an $n^{th}$ cycle in the unloading stage, which is denoted as a third expected force value;

calculating a third error according to the third actual measured force value and the third expected force value, and determining a third error change rate based on a difference between a current cycle error and a previous cycle error;

inputting the third error and the third error change rate into the optimized fuzzy predictive controller to acquire movement steps of the motor in the unloading stage; and sending the movement steps of the motor in the unloading stage to the actuator, and controlling the motor to move until the load is reduced to zero.

2. The load control method of the indenter based on the fuzzy predictive control according to claim 1, further comprising: immediately turning off a power supply when the indenter fails.

3. The load control method of the indenter based on the fuzzy predictive control according to claim 1, wherein optimizing the fuzzy predictive controller specifically comprises:

optimizing the fuzzy predictive controller by introducing adaptive factors and the movement steps of the motor in each cycle.

4. The load control method of the indenter based on the fuzzy predictive control according to claim 1, wherein sending the movement steps of the motor in the loading stage to the actuator, controlling the motor to move until the set load is reached, and entering the full load stage specifically comprises:

sending the movement steps of the motor in the loading stage to the actuator, controlling the motor to move, increasing the load, and entering the full load stage.

5. The load control method of the indenter based on the fuzzy predictive control according to claim 1, wherein controlling the motor to move based on the second error until the full load time is reached, and entering the unloading stage specifically comprises:

controlling the motor to move based on the second error, increasing the load until the full load time is reached, and entering the unloading stage.

6. The load control method of the indenter based on the fuzzy predictive control according to claim 1, wherein a control rule table of the optimized fuzzy predictive controller is as follows:

| Fuzzy set | Operation | Output |
| --- | --- | --- |
| NB | S = S − C; C = 1 | 0 |
| NM | C−−; S−− | 0 |
| NS | S−− | S |
| ZO |  | S |
| PS | S++ | S |
| PM | C++; S++ | S |
| PB | C++; S = S + 2C | S | where S represents the movement steps of the motor in each cycle, and C represents an adaptive factor.

7. A load control system of an indenter based on fuzzy predictive control, wherein the load control system comprises:
- a first actual measured force value acquiring module, which is configured to acquire an actual measured force value of a sensor in a loading stage, which is denoted as a first actual measured force value;
- a first expected force value acquiring module, which is configured to acquire an expected force value of an $n^{th}$ cycle in the loading stage, which is denoted as a first expected force value;
- a first error and first error change rate calculating module, which is configured to calculate a first error according to the first actual measured force value and the first expected force value, and determine a first error change rate based on a difference between a current cycle error and a previous cycle error;
- a fuzzy predictive controller establishing module, which is configured to establish a fuzzy predictive controller;
- an optimizing module, which is configured to optimize the fuzzy predictive controller;
- a motor movement step determining module in the loading stage, which is configured to input the first error and the first error change rate into the optimized fuzzy predictive controller to acquire movement steps of a motor in the loading stage;
- a first executing module, which is configured to send the movement steps of the motor in the loading stage to an actuator, control the motor to move until a set load is reached, and enter a full load stage;
- a second actual measured force value acquiring module, which is configured to acquire an actual measured value of the sensor in the full load stage, which is denoted as a second actual measured force value;
- a second expected force value acquiring module, which is configured to acquire an expected force value of an $n^{th}$ cycle in the full load stage, which is denoted as a second expected force value;
- a second error calculating module, which is configured to calculate a second error based on the second actual measured force value and the second expected force value;
- a second executing module, which is configured to control the motor to move based on the second error until full load time is reached, and enter an unloading stage;
- a third actual measured force value acquiring module, which is configured to acquire an actual measured force value of the sensor in the unloading stage, which is denoted as a third actual measured force value;
- a third expected force value acquiring module, which is configured to acquire an expected force value of an $n^{th}$ cycle in the unloading stage, which is denoted as a third expected force value;
- a third error and third error change rate calculating module, which is configured to calculate a third error according to the third actual measured force value and the third expected force value, and determine a third error change rate based on a difference between a current cycle error and a previous cycle error;
- a motor movement step determining module in the unloading stage, which is configured to input the third error and the third error change rate into the optimized fuzzy predictive controller to acquire movement steps of the motor in the unloading stage; and
- a third executing module, which is configured to send the movement steps of the motor in the unloading stage to the actuator, and control the motor to move until the load is reduced to zero.

8. The load control system of the indenter based on the fuzzy predictive control according to claim 7, wherein the load control system further comprises a power turning-off module, which is configured to immediately turn off a power supply when the indenter fails.

* * * * *